United States Patent [19]
Cahuzac

[11] Patent Number: 5,759,321
[45] Date of Patent: Jun. 2, 1998

[54] METHOD FOR PRODUCING A REINFORCEMENT IN THE FORM OF A SHEET FOR A COMPOSITE COMPONENT

[75] Inventor: Georges Cahuzac, Le Bouscat, France

[73] Assignee: Aerospatiale Societe Nationale Industrielle, Paris, France

[21] Appl. No.: 686,307

[22] Filed: Jul. 25, 1996

Related U.S. Application Data

[63] Continuation of Ser. No. 421,418, Apr. 13, 1995, abandoned.

[30] Foreign Application Priority Data

Apr. 18, 1994 [FR] France ................... 94 04582

[51] Int. Cl.$^6$ ................................................ D04H 3/10
[52] U.S. Cl. .................. 156/93; 156/148; 156/166
[58] Field of Search ........................... 156/93, 148, 166; 112/470.06, 470.13, 440

[56] References Cited

U.S. PATENT DOCUMENTS

| | | |
|---|---|---|
| 3,322,868 | 5/1967 | Kruse et al. |
| 3,425,884 | 2/1969 | Brinkema |
| 3,955,602 | 5/1976 | King |
| 4,038,440 | 7/1977 | King |
| 4,218,276 | 8/1980 | King |
| 4,268,560 | 5/1981 | Maistre |
| 4,288,267 | 9/1981 | McLarty ................... 156/425 X |
| 4,503,788 | 3/1985 | Giannuzzi et al. .......... 112/470.06 |
| 4,917,756 | 4/1990 | Cahuzac et al. ............. 156/93 X |
| 5,333,562 | 8/1994 | LeMaire et al. ............. 112/440 X |
| 5,428,896 | 7/1995 | Auberon et al. |
| 5,429,853 | 7/1995 | Darrieux ...................... 156/93 X |
| 5,468,329 | 11/1995 | Philpot ......................... 156/169 X |
| 5,599,603 | 2/1997 | Evans et al. ................. 428/66.2 |

FOREIGN PATENT DOCUMENTS

| | | |
|---|---|---|
| A-0284497 | 9/1988 | European Pat. Off. |
| A-0547738 | 6/1993 | European Pat. Off. |
| A-2355936 | 1/1978 | France |
| A-2395340 | 1/1979 | France |
| A-2531459 | 2/1984 | France |
| A-3712013 | 10/1988 | Germany |
| 2159460 | 12/1985 | United Kingdom |

OTHER PUBLICATIONS

Marien, Shirley, "Stitchery Needlepoint Applique and Patchwork a Complete Guide," The Viking Press, New York, 1974, p. 29.

Banner, Bertha, "Household Sewing with Home Dressmaking," Longmans, Green, and Co., New York, 1898, pp. 2–7.

*Primary Examiner*—Jeff H. Aftergut
*Attorney, Agent, or Firm*—Marshall, O'Toole, Gerstein, Murray & Borun

[57] ABSTRACT

The invention relates to a method for producing a reinforcement in the form of a sheet for a composite component, the reinforcement including superposed plies of thread. In accordance with the method, straight portions of thread are arranged, for each ply, at least substantially in a parallel fashion with respect to each other and all the superposed plies are consolidated by using a thread passing through the plies. According to the invention, the superposed plies are laid down on a support, the superposed plies are compacted by mechanical pressure, and in order to preserve the state of compaction of the plies which is thus obtained, the thread for consolidating the plies is stitched, without knotting, through the plies down to at least the level of the surface of the support, the plies having, after compaction, a density of the portions of the thread constituting them which is sufficient to retain the consolidating thread by friction.

11 Claims, 11 Drawing Sheets

METHOD FOR PRODUCING A REINFORCEMENT IN THE FORM OF A SHEET FOR A COMPOSITE COMPONENT

This is a Continuation of U.S. application Ser. No. 08/421,418, filed Apr. 13, 1995, now abandoned.

Background of the Invention

The present invention relates to a method for producing a reinforcement in the form of a sheet for a composite component formed by said reinforcement embedded a cured matrix, said reinforcement including superposed plies of thread (especially carbon, glass or boron thread) and to a machine for implementing said method, as well as to a reinforcement and a composite component which are thus obtained.

More particularly, although not exclusively, such composite components are used in the aeronautical and space fields by virtue of their excellent properties of resistance to mechanical and/or thermal stresses.

Many methods are known for obtaining said composite components and, especially, their reinforcement. In general, the first step is to produce the reinforcement from fibers (threads), in particular inorganic fibers, distributed in at least two directions, after which the material of the matrix is injected into the reinforcement and said material is cured in order to form said matrix and, thus, said composite component.

For example, the Applicant's Patent EP-B-0,284,497 describes a method for producing a reinforcerment for a composite component formed by said reinforcement embedded in a cured matrix, said reinforcement including superposed plies of thread, according to which method:

- at least some of said plies are produced by laying down straight portions of thread, forming part of a continuous thread, on a support, pulling tight each portion of thread between two points for positionally fixing the ends of said portion, the ply thus consisting of portions of thread extending at least substantially in a parallel fashion with respect to each other, and the lengths of thread of said ply extending in a direction which is either parallel or crossed with respect to the direction of the portions of threads of any other ply of the reinforcement; and
- all the superposed plies are consolidated by stitching, without knotting, a continuous thread passing through said plies.

In this case, in order to lay down the straight portions of thread constituting the corresponding plies, a special device is used which comprises a tube, open at its lower end and having an opening at its upper part, for the passage of a continuous thread. This laying-down head allows each portion of thread to he pulled tight between points for positionally fixing its ends, these fixing points being formed by pins temporarily implanted in the support made of a material which can be penetrated by said pins, such as a foam of synthetic material. After forming the superposed plies of thread and after consolidating said plies, the pins are removed from the support.

However, in Patent EP-B-0,284,497, this involves producing at least substantially cylindrical reinforcements and, in order to do this, the support is in the form of a likewise cylindrical mandrel. Thus, each ply consisting of straight portions of thread is already compressed by the superjacent ply consisting of a length of continuous thread, wound around said mandrel, which superiacent ply also makes it possible, as required, to compress and compact all the subjacent plies already laid down on the mandrel. The consolidation of the superposed plies by stitching, without knotting, a continuous thread passing through said plies may therefore be performed, as illustrated by FIGS. 10a to 10f of Patent EP-B-0,284,497, simply by inserting the thread through the plies using a needle, the thread being retained therein in the form of loops because of the very fact that the plies through which it passes are already, by construction, compressed. The consolidating thread reinforces the compaction and compression effect, obtained beforehand when laying down the plies consisting of circumferential lengths of thread, and ensures that all the plies are held together and that the reinforcement has mechanical integrity.

However, when it is desired to produce reinforcementes in the form of sheets (plane or curved) from superposed plies each consisting of straight portions of thread, the problem of consolidating the superposed plies is of a different nature.

In fact, in this case, if possible interlacing of the successive plies is disregarded, which is not desirable either for other reasons, the superposed plies are, by construction, not compressed. One solution for solving this problem is mentioned in Patent EP-0,056,351. Here, the reinforcement consists of plies called "warp thread" plies and of plies called "filling thread" plies, these being superposed in parallel planes, the threads of the plies not being mutually interlaced, and the upper ply and the lower ply of the set of plies consisting or "filling" plies. Consolidation of said "warp" and "filling" plies is achieved by means of binding threads which pass through these plies, going around the filling threads of the external (upper and lower) plies so as to form, together with them, a typical fabric trapping the internal warp and filling plies.

It should be noticed therefore that, in this case, the compaction of the warp and filling plies is solely achieved by pulling on the binding threads. Indeed, as they are arranged, the binding threads require, obviously, a shuttle in order to lay them down, which necessitates the plies having a low "density" of the warp and filling threads (or a large spacing between these threads), as well as a small thickness, this consequently requiring a tension to be exerted on the binding threads in order to hold in place and to compact the warp and filling threads. Such a tension runs the risk, of course, of breaking the binding threads which are by nature fragile. Moreover, the solution indicated hereinabove finally results in producing, at least in part, a typical fabric by interlacing the filling threads of the external plies and the binding threads, these being in fact equivalent to warp threads.

SUMMARY OF THE INVENTION

The object of the present invention is to avoid these drawbacks and relates to a method for producing a reinforcement in the form of a sheet for a composite component, by means of which method the mechanical intecrity of the reinforcement is ensured without it being necessary, in order to achieve this, to produce a kind of "fabric" of interlaced filling threads and binding threads.

For this purpose, the method for producing a reinforcement in the form of a sheet for a composite comonent formed by said reinforcement embedded in a cured matrix, said reinforcement including superposed plies of thread, according to which method:

said superposed plies are produced by arranging, for each ply, straight portions of thread at least substantially in a parailel fashion with respect to each other, the straight portions of thread of each ply extending in a direction which is either parallel or crossed with respect to the direction of the straight portions of thread of any other ply in the reinforcement; and all the superposed plies are consolidated using a thread passing through said plies, said consolidating thread passing and repassing through said plies in order to cover at least the major part of the surface of said plies, is noteworthy, according to the invention, in that:

said superposed plies are laid down on a support;

said superposed plies are compacted by mechanical pressure; and in order to preserve the state of compaction of said plies which is thus obtained, the thread for consolidating the plies is stitched, without knotting, through said plies at least as far as the level of the surface of said support, forming stitches over at least the major part of the surface of said plies, these plies having, after compaction, a density of the portions of thread constituting them which is sufficient to retain said consolidating thread by means of friction.

Thus, the mechanical integrity of the reinforcement is solely obtained by the friction of the consolidating thread on the portions of thread constituting the superposed plies, without applying stress on said consolidating thread, and this is achieved by prior compaction of the superposed plies in order to reach a sufficient density of the portions of thread constituting them.

Advantageously, the density of the portions of thread constituting said superposed plies is such that said portions of thread occupy at least 40% of the volume of the composite component, the remainder being occupied by the consolidating thread and the matrix.

Preferably, said portions of thread occupy between 40 and 60% of the volume of the composite component, while the consolidating thread occupies from 1 to 10% of the volume of the composite component.

Moreover, each of said straight portions of thread is pulled tight between two points for positionally fixing the ends of said portion.

In particular, each positional fixing point may be manifested by a peg implanted in the marginal zone of said support, around which peg passes the junction between two straight portions of thread of the same direction but of opposite senses. This allows the straight portions of thread to be easily laid down in two orthogonal directions.

According to another characteristic of the invention, said support consists of a quadrilateral frame surrounding a mass of soft material, such as a foam of synthetic material, and said hooking-on pegs are implanted on the perimeter of said frame.

In this case, said hooking-on pegs may be implanted on the perimeter of said frame, these being uniformly distributed in a pattern of a broken line on each face of the frame. This allows straight portions of thread to be easily laid down in an inclined direction, for example at 45°, with respect to the two aforementioned orthogonal directions.

Moreover, guiding pegs may be implanted inside the hooking-on pegs, forming several rows of pegs in a staggered configuration on each face of the frame.

In order to avoid any risk of the portions of thread escaping, said hooking-on pegs are advantageously implanted so as to incline outwardly from the frame.

In addition, in order to obtain reinforcing elements of arbitrary shape from the reinforcement, additional guiding and hooking-on pegs may be implanted in the mass of soft material surrounded by the frame.

The present invention also relates to a machine for implementing the method which has just been described,
comprising a stand provided with a subframe and with uprights for mounting a transverse bar on which is mounted a carriage, which can move in a first, X, direction, ecuipped with a first arm extending in a second, Y, direction orthogonal to the X direction and carrying a second arm able to slide transversely with respect to the plane defined by said bar and said first arm in a third, Z, direction, motor means for driving said carriage and said first and second arms, and thread laying-down and stitching tools capable of being removably mounted on a support at one end of said second arm, which machine is noteworthy, according to the invention, in that the thread laying-down tool has a rigid tube extended by a flexible tube, the thread passing through said tubes.

Advantageously, said stitching tool has a rotary support at the lower end of which a needle, associated with a presser-foot, is mounted.

Either said needle is hollow and a thread-guiding channel connected to said needle passes through said support, or said needle has an oblique through-eye and is associated with a thread-guide comprising a body through which passes obliquely a channel for passage of the thread, the lower end of said channel being flared.

Preferably, the stitching tool comprises a mechanism for actuating the presser-foot/thread-guide/needle assembly, consisting of a first cylinder actuator actuating a plate on which said assembly is mounted, a spindle carrying the thread-guide and a second cylinder actuator actuating the presser-foot.

Advantageously, said needle is held in position on said plate by means of a support, using a conical clamp tightened by a nut.

Moreover, the spindle carrying the thread-guide is stressed by a tensioning spring and retained by a stop.

BRIEF DESCRIPTION OF THE DRAWINGS

The figures of the appended drawing will make it clear how the invention may be realized. In these figures, identical references designate similar elements.

DETAILED DESCRIPTION OF A PREFERRED EMBODIMENT

Figure 1:
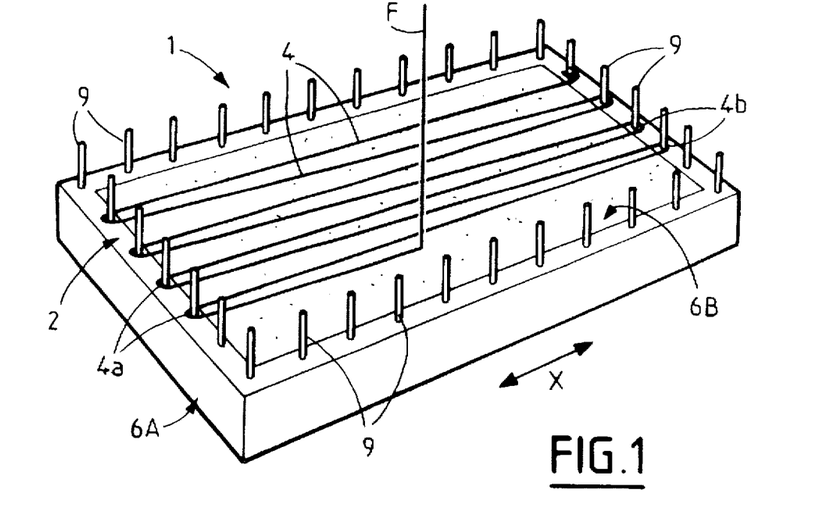
FIGS. 1 to 3 illustrate three steps of an example of the method according to the invention for producing a reinforcement for a composite component on a support having a plane upper surface.
Figure 2:
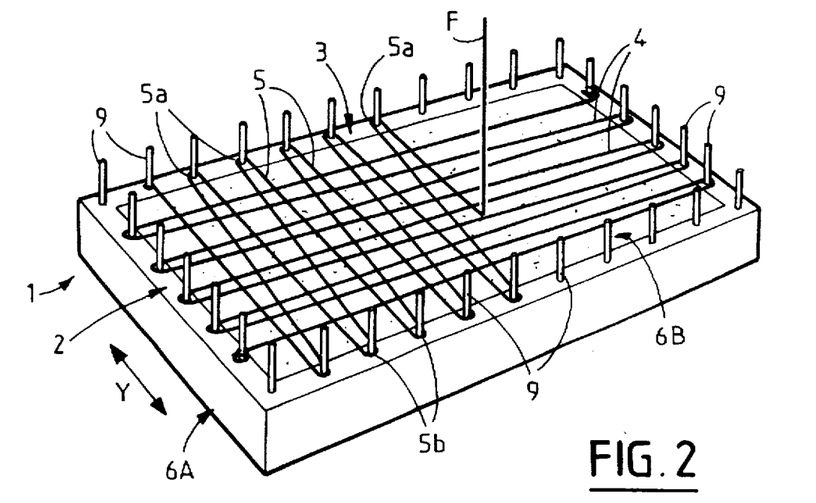
Figure 3:
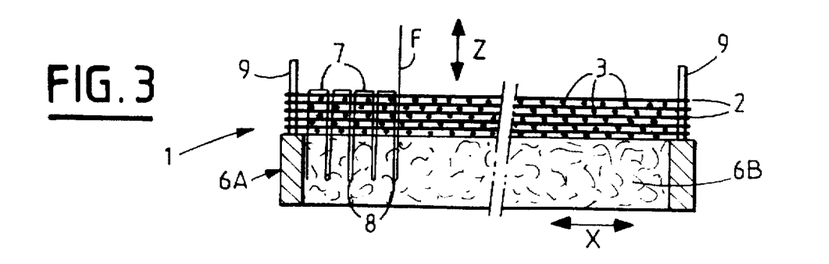

Depicted in FIGS. 1 to 3 are three steps in the manufacture of an embodiment of a reinforcement 1 according to the invention, comprising first and second superposed plies 2, 3 of continuous thread F.

More particularly, each ply 2, 3 is produced by laying down straight portions of thread 4, 5 forming part of a continuous thread F on a support consisting of a quadrilateral frame 6A, surrounding a mass 6B of material capable of being penetrated by needles (or pegs), as will be seen in more detail below. A suitable material for this is a foam of synthetic material/especially a polyurethane foam. Likewise, the material of the frame 6A must allow implantation of pegs. Since the reinforcement 1 to be produced has to be in the shape of a plane, or possibly curved, sheet, the upper surface of the support, especially of the foam GB, will have a corresponding geometry and will be, especially, plane, as depicted in FIGS. 1 to 3.

As shown in FIGS. 1 to 3, each ply 2, 3 consists of portions of thread 4, 5 extending in a parallel fashion with respect to each other. A lack of parallelism, visible in FIGS. 1 and 2, is due to the fact that, for reasons of clarity of the drawing, the portions of thread are spaced apart more than in reality. In addition, the portions of thread 4 of the first plies 2 extend in a first, X, direction, while the portions of thread 5 of the second plies 3 extend in a second, Y, direction which is crossed with respect to the first, X, direction and is especially orthogonal with respect to the latter, as shown. In the embodiment of FIGS. 1 to 3, the reinforcement 1 therefore comprises an alternating succession of first plies 2 and of second plies 3, the straight portions of thread 4, 5 of which extend in two crossed directions, in other words, the reinforcement 1 is a sheeted structure, any two successive "sheets" of which have segments of thread (or fiber) extending in two crossed directions. Each sheet of the structure comprises one or possibly more "layers" of thread which consists especially, as already indicated, of carbon, glass or boron.

Furthermore, in order to lay it down, each portion of thread 4, 5 is pulled tight between two points for positionally fixing the ends of said portion, each positional fixing point being manifested by a peg 9 (small rigid rod made of metal or other material) implanted on the perimeter of the frame 6 and around which passes the junction 4a, 4b; 5a, 5b between two straight portions of thread 4, 5 of the same, X or Y, direction but of opposite senses (the term "sense" referring in this case to the sense of laying down or "advancing" the thread).

After forming all the superposed plies 2, 3, these are consolidated by stitching, without knotting, in the Z direction, a continuous thread F passing through said plies, and forming stitches 7 having open loops 8, the latter extending into the foam support 6B. The Z direction is transverse to the plane defined by the X and Y directions, possibly being inclined with respect to this plane. However, in general the Z direction will be orthogonal to the X,Y plane.

As will be described in more detail with regard to FIGS. 19A to 19D, this latter operation includes compaction of the superposed plies 2, 3 by mechanical pressure and, in order to preserve the state of compaction of said plies that is thus obtained, the plyconsolidating thread F is stitched, without knotting, through the plies, forming stitches 7 over at least the major part of the surface of said plies 2, 3, having, after compaction, a density of the portions of thread 4, 5 constituting them which is sufficient to retain the consolidating thread F by means of friction.

In particular, the density of the portions of thread 4, 5 constituting the superposed plies 2, 3 is such that said portions of thread 4, 5 occupy at least 40%, preferably between 40 and 60%, of the volume of the composite component, the remainder being occupied by the consolidating thread, as regards 1 to 10% of the total volume, and by the matrix (assuming that the cured matrix occupies all the voids in the reinforcement).

As shown in FIGS. 1 to 3, the hooking-on pegs 9 may be simply distributed uniformly in a linear fashion on each face of the frame 6A, thus allowing the straight portions of thread 4, 5 to be laid down in two, X and Y, orthogonal directions. However, other configurations of the pegs may be provided.

Figures 4, 5, 7, 8:
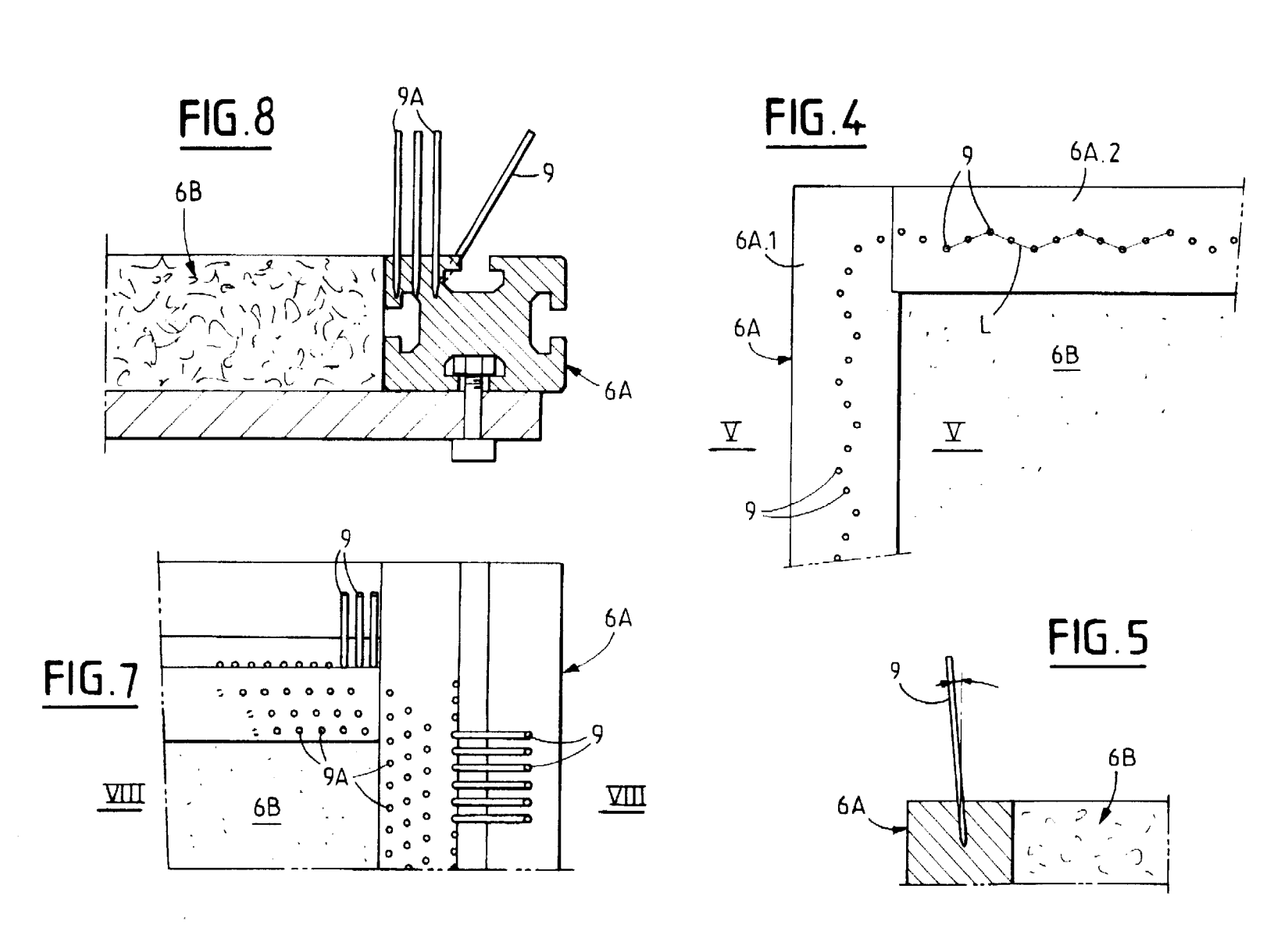
FIG. 4 illustrates diagrammatically an example of a paltern of implantation of the hooking-on pegs on the support.
FIG. 5 is the cross-section along the line V—V of FIG. 4.
FIG. 7 illustrates the implantation of additional guiding pegs on the support.
FIG. 8 is a cross section along the line VIII—VIII of FIG. 7.
Figure 6:
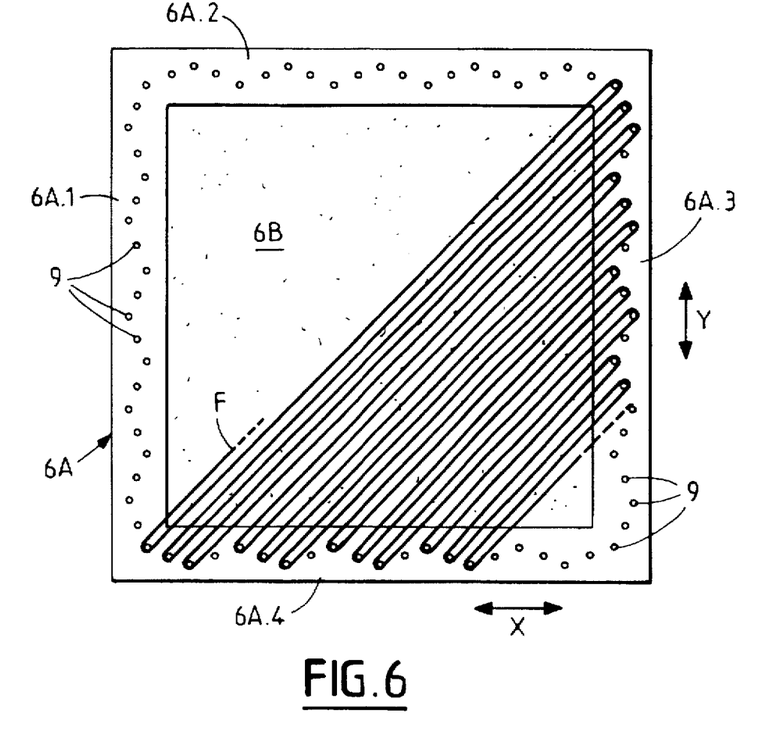
FIG. 6 shows one possible way of laying down straight portions of thread by means of the pattern of implantatlion of the pegs of FIG. 4.

Thus, in FIGS. 4 to 6, the hooking-on pegs 9 are implanted on the perimeter of the frame 6A, these being uniformly distributed in a pattern along a broken line L on each face 6A.1–6A.4 of the frame. In order to prevent possible unhooking of the threads of the upper plies, the pegs 9 are slightly inclined (by the order of a few degrees with respect to the vertical) outwardly from the frame 6A. Moreover, this particular configuration of the pegs 9 especially allows a ply of thread F to be laid down diagonally with respect to the X and Y directions (FIG. 6), while at the same time obtaining a pitch (the separation between two parallel portions of thread) substantially equal to that obtained for plies "oriented" along X or Y. In order to do this, as also shown in FIG. 6, three pegs in four must each time be incorporated for a 45° orientation of the portions of thread, .or example, with respect to the X and Y directions. It is clear that a 135° orientation is also possible.

It is also possible to implant guiding pegs 9A inside the hooking-on pegs 9, that is to say, on the frame, between these hooking-on pegs and the mass of soft material 6B, forming several rows of pegs in a staggered configuration on each face of the frame 6A, as shown in FIGS. 7 and 8. In this case, the (for example) three rows of guiding pegs consist of vertical pegs, while the row of linearly distributed hooking-on pegs 9 which possibly have a larger diameter and are inclined outwardly from the frame 6A so as to allow the laid-down threads to be lowered and held in place.

Furthermore, additional guiding and hooking-on pegs (not depicted) may be implanted, as desired, in the mass of soft material 6B so as to obtain particular patterns or reinforcing elements in the reinforcement.

Figure 9:
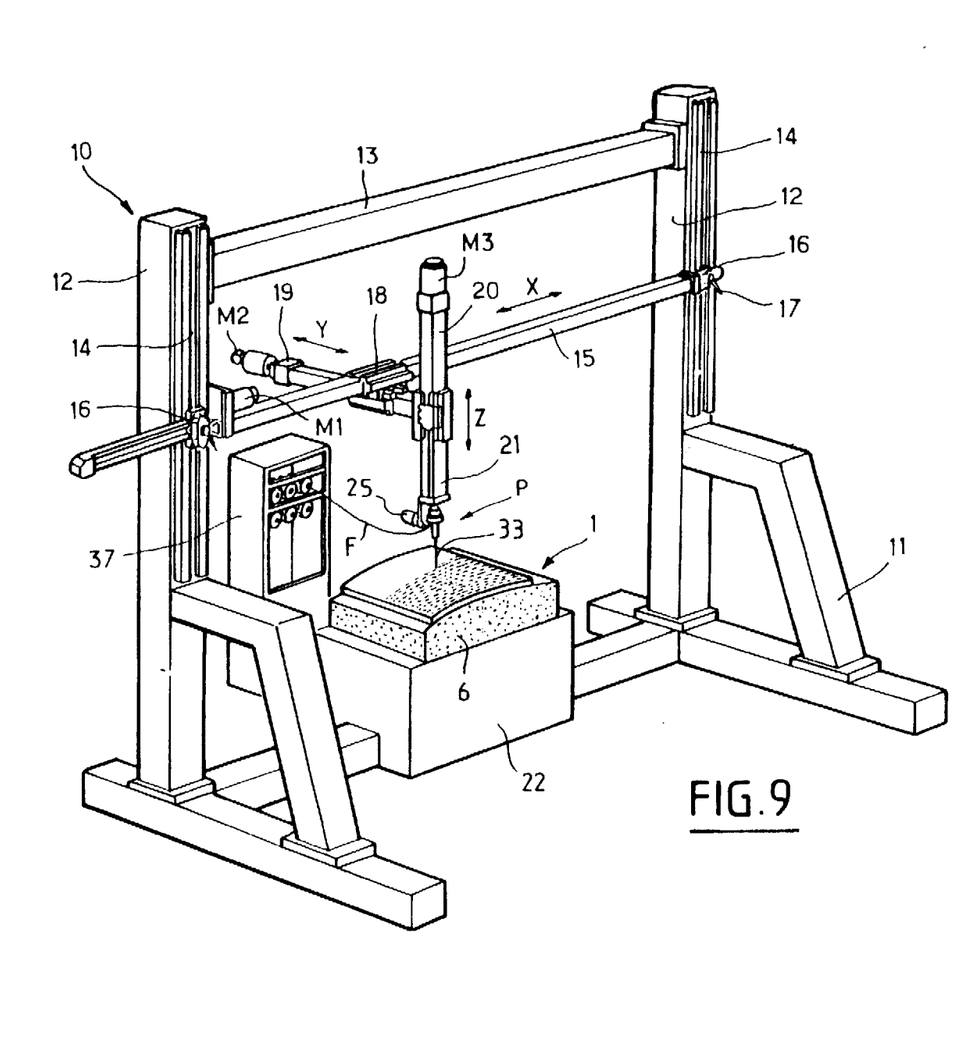
FIG. 9 shows diagrammatically, in perspective, an example of a machine for producing the reinforcement of FIGS. 1 to 3.

In order to produce, especially, the reinforcement 1 shown by FIGS. 1 to 3, the machine 10 requiring no knotting of the thread F may be employed, this machine being illustrated diagrammatically in FIG. 9 and described in Patent EP-B-0.284.497.

This machine 10 comprises a stand provided with a subframe 11 and with vertical uprights 12 joined at their upper part by a horizontal crosspiece 13.

Each vertical upright 12 comprises a slideway 14 and a transverse bar 15 which is fixed near its ends in slides 16 mounted in the slideways 14 in which they can be immobilized by screws 17. By virtue of this arrangement, it is possible to adjust the height of the bar 15 on the uprights 12.

Mounted on the bar 15 is a carriage 18 on which is provided a horizontal arm 19 which can slide transversely and adjustably with respect to the bar 15.

At one of its ends, the horizontal arm 19 carries a vertical arm 20 which is also mounted in a sliding and adjustable manner.

Figure 10:
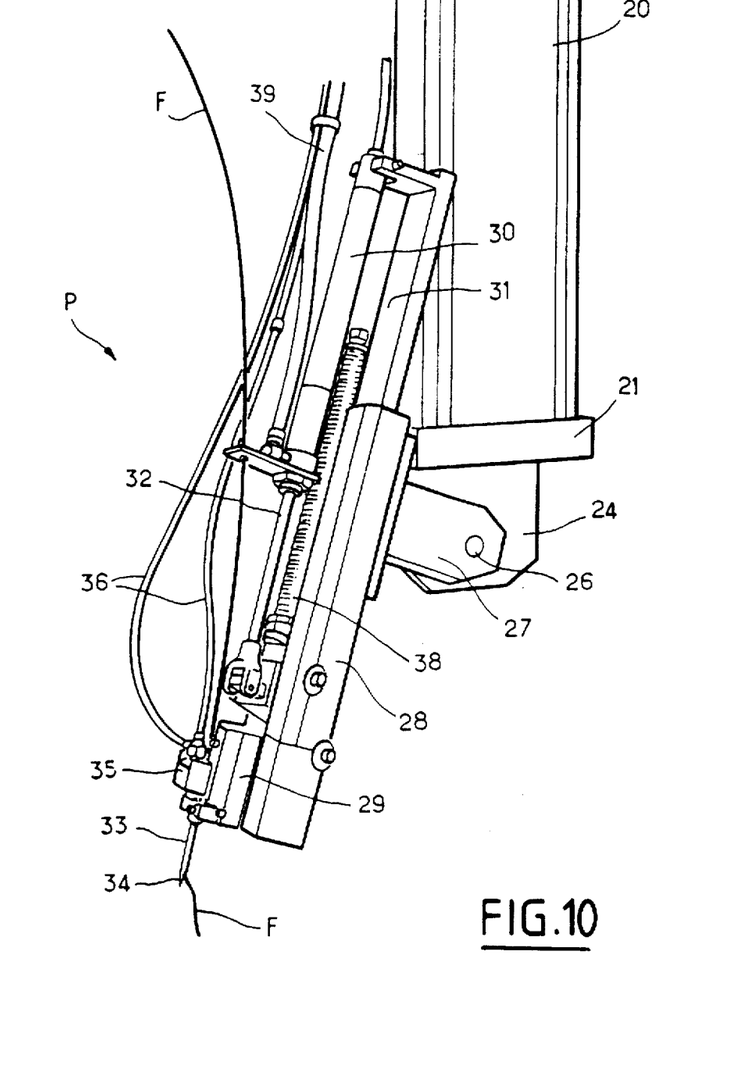
FIG. 10 is a diagrammatic view, in perspective, of a stitching device for the machine of FIG. 9.

At its lower end 21, the vertical arm 20 comprises fixing means adapted to receive a laying-down and stitching device P, which is more clearly visible in FIG. 10.

The machine furthermore includes a base 22, supporting a support 6 for the reinforcement 1, having the shape of a convex sheet.

It will be noted that, in FIG. 9, the plies 2 and 3 have already been laid down and that the stitching device P is in the process of consolidating the superposed plies.

It is understood that, by virtue of the arrangement of the bar 15 and of the arms 19 and 20, the end 21 may be adjusted to any desired position with respect to the support 6, along three orthogonal axes X, Y and Z, by means of motors M1, M2 and M3 which are represented, by way of example, mounted on the bar 15 and at the ends of the arms 19 and 20 and drive the latter along these three axes by means of suitable known systems with a rack and pinion, worm or the like.

As FIG. 10 shows, the lower end 21 of the arm 20 comprises a foot 24 which is fixed in its extension and on which an electric motor 25 is fixed, for example a stepper motor, the horizontal shaft 26 of which extends through the foot 24.

It will be noted that the stitching device P may be oriented in a vertical plane, through the action of the motor 25.

The stitching device P, mounted on the lower end 21 of the vertical arm 20, includes a support 27, fixed to the shaft 26, on which is fixed a rail 28, a block 29 sliding in the rail 28, a pneumatic cylinder actuator 30, the cylinder of which is fixed on an extension 31 of the rail 28, joined to the latter and the piston rod 32 of which is connected to the block 29.

The block 29 carries a needle 33, described in detail below.

The opposite end of the needle to its point 34 is fixed beside a pneumatic thread-gripper 35, of known type, mounted on the block 29.

The thread-gripper 35 is connected via conduits 36 to a source of compressed air (not shown) and the thread F, originating from a source 37, supplies said needle 33.

A return spring 38 is provided between the block 29 and the rail 28, so that when the cylinder actuator 30, supplied via a pipe 39, has pushed the block 29 into an extended position and is then set to release, the spring 38 pulls back the block 29 and the needle.

It will be noted that, by virtue of the motor M3 and/or the cylinder actuator 30, it is possible to adjust the depth, of penetration of the needle 33.

Figure 11:
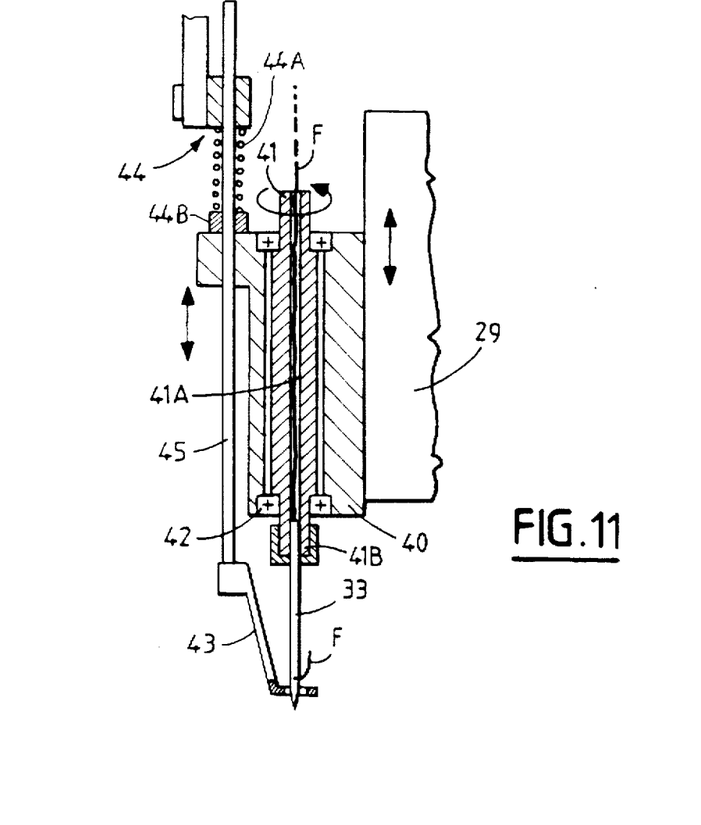
FIG. 11 is a diagrammatic view, in section, illustrating one arrangement according to the invention of a stitching needle.

Moreover, in order to allow the to-and-fro motion of the needle 33 with respect to the support 6 (in order to lay down the successive portions of thread of one ply), provision is made, as is seen in FIG. 11, for a support 40, mounted on the block. 29, in which is arranged a guide 41, able to rotate on the bearings 42 by virtue of driving means which are not depicted, through which guide passes a longitudinal channel 41A for the passage of the thread F and the lower end 41B of which guide carries the needle 33. In addition, as also shown in this FIG. 11, a presser-foot 43 is associated with the needle 33, which presser-foot may be set in motion parallel to the longitudinal extension of the needle using a spring mechanism 44. More particularly, the spring mechanism 44, controlling the presser-foot 43, includes a linkage bar 45, pushed downward by a compression spring 44A and retained by a stop 44B in contact with the support 40 of the needle 33 when the needle is outside the laid down plies. When the needle 33 descends, the presser-foot 43 is retained by the plies and the spring 44A exerts a compressive force on the plies.

Figure 12:
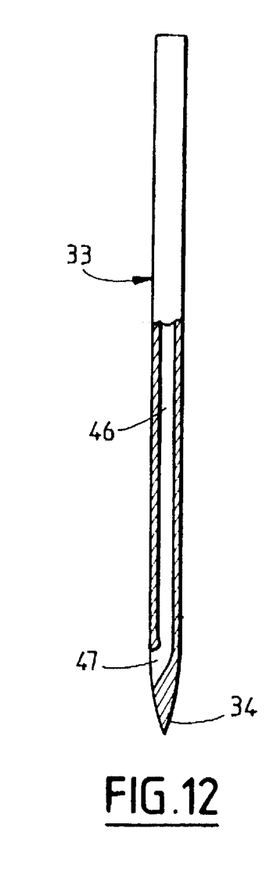
FIGS. 12 and 13 are views, in longitudinal section, of two embodiment variants of the needle used in the method of the invention.

As illustrated in FIG. 12, the needle 33 may be a hollow needle through which passes an axial channel 46, for passage of the thread, and which includes a non-through eye 47 into which the channel 46 emerges laterally and obliquely.

Figure 13:
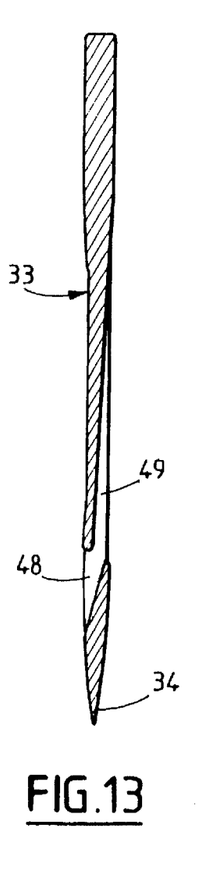

However, the needle 33 may advantageously be as depicted in FIG. 13, that is to say it comprises an oblicue through-eye 48 emerging into a longitudinal groove 49 of cross section in the form of a circular arc, the depth of which groove decreases progressively on going away from the tip 34 of the needle and through which groove the thread is intended to pass.

Figure 14:
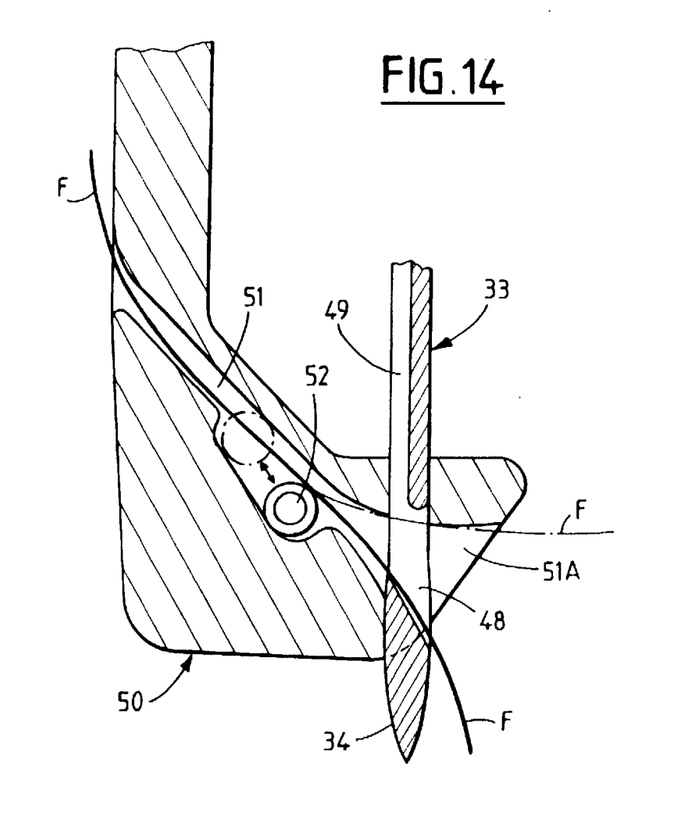
FIG. 14 shows, in section, a thread-guide for the needle of FIG. 13.

When this latter needle is used, a special thread-guide may be provided, as shown in FIG. 14. The thread-guide has a body 50, substantially in the form of an L, through which passes obliquely a channel 51 for the passage of the thread F, the lower end 51A of said channel being flared in order to allow the thread to be guided, either substantially vertically or substantially horizontally (thread F depicted by the dot-dash lines), as will be seen in more detail below. A wheel 52 releases the thread F, by advancing into the channel 51, and traps it, by moving back into said charnel. In fact, it is the sliding of the thread which, on, pulling downward, makes the wheel 52 rotate, opening the channel 51, whereas a rearward motion ("rise" of the thread) blocks the thread once again.

Figure 15:
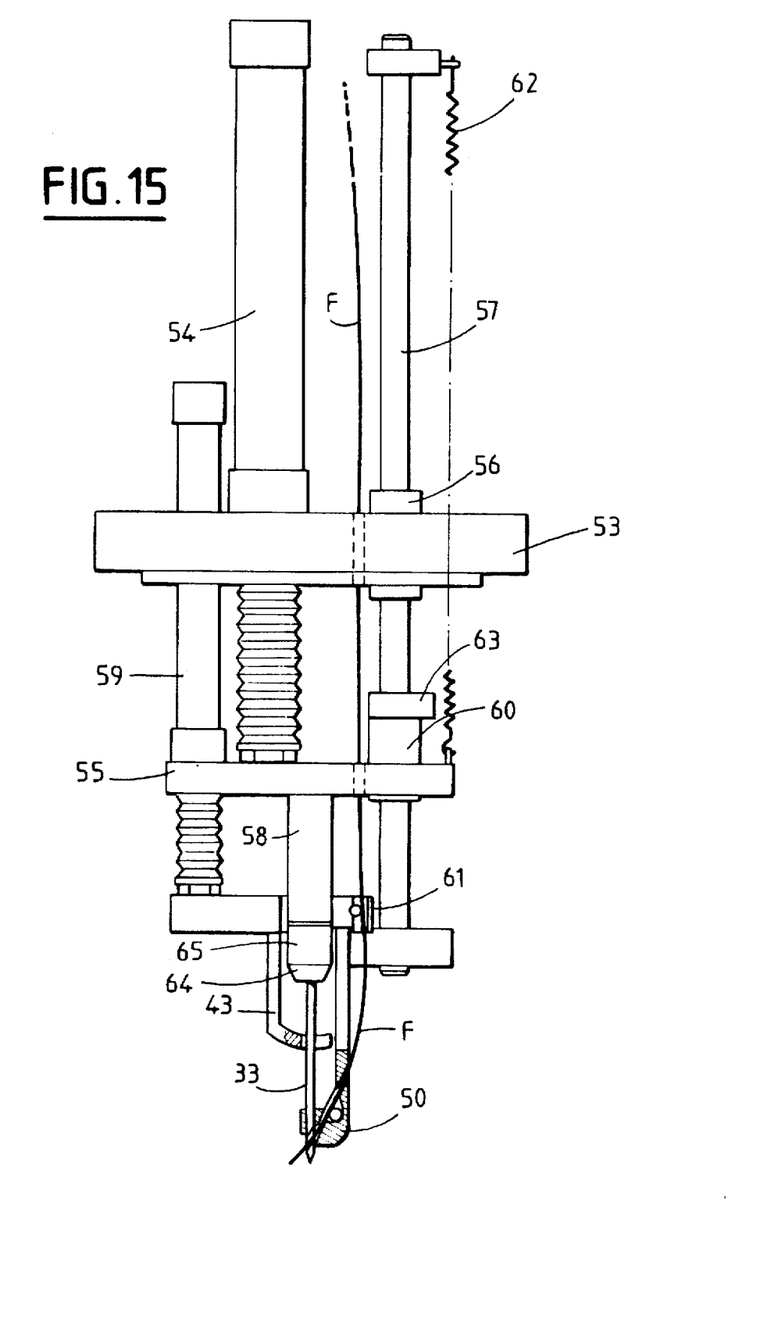
FIG. 15 illustrates diagrammatically a stitching head equipped with a needle and with a thread-guide according to FIG. 14.

In FIG. 15, a stitching head is shown which comprises the presser-foot 43/thread-guide 50/needle 33 assembly (FIG. 19). A pneumatic cylinder actuator 54, which actuates a plate 55, is screwed onto a circular flange 53 which may be fixed to the tool holder of the machine 10 (or that of the machine 71 described hereinbelow with regard to FIGS. 17 and 18). Moreover, the flange 53 carries a bush 56 with balls for guiding a spindle 57. The plate 55 itself carries a support 58 for the needle 33, an auxiliary cylinder actuator 59 and a second bush 60 with balls sliding on the spindle 57. The auxiliary cylinder actuator 59 carries the presser-foot 43 and a thread-gripper 61, similar to the thread-guide 50, for the thread F, while the guiding spindle 57 carries the thread-guide or thread-gripper 50, being stressed by the tensioning spring 62 and retained by a stop 63. The needle 33 is held in position on the support 58 using a conical gripper 64 tightened by a nut 65.

Furthermore, for laying down portions of thread of the superposed plies, it is possible to use the device described in Patent EP-B-0,284,497. However, in accordance with the invention, it is advantageous to use the tool 66 shown in FIG. 16, hereinbelow called filling-in head, that is to say a head for laying down the threads constituting the superposed plies of the reinforcement. The filling-in head 66 is mounted on a support 67, which may be firmly attached to the tool holder of the machine, and consists of a rigid tube 68 extended by a flexible tube 69 which may be made in the form of EL spring with touching turns and which terminates in an endpiece 70, the thread F passing through said tubes and said endpiece.

Figure 17:
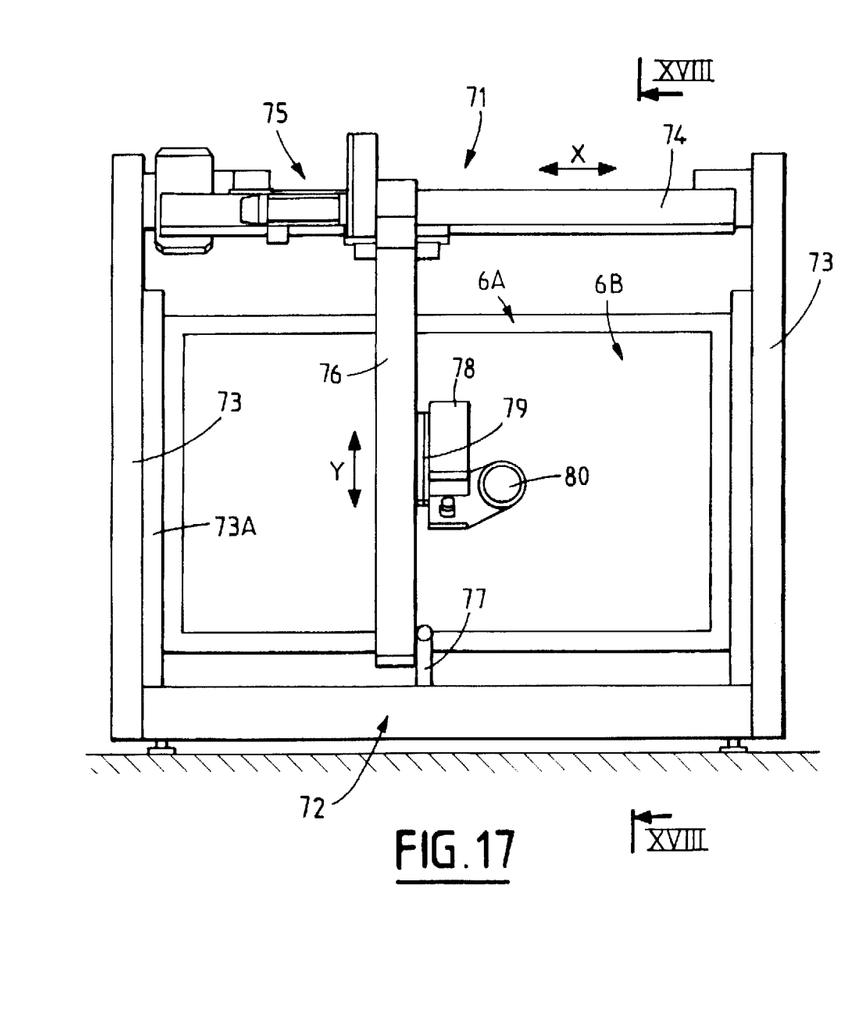
FIG. 17 is a diagrammatic view of a face of a second example of a machine for producing the reinforcement of FIGS. 1 to 3.
Figure 18:
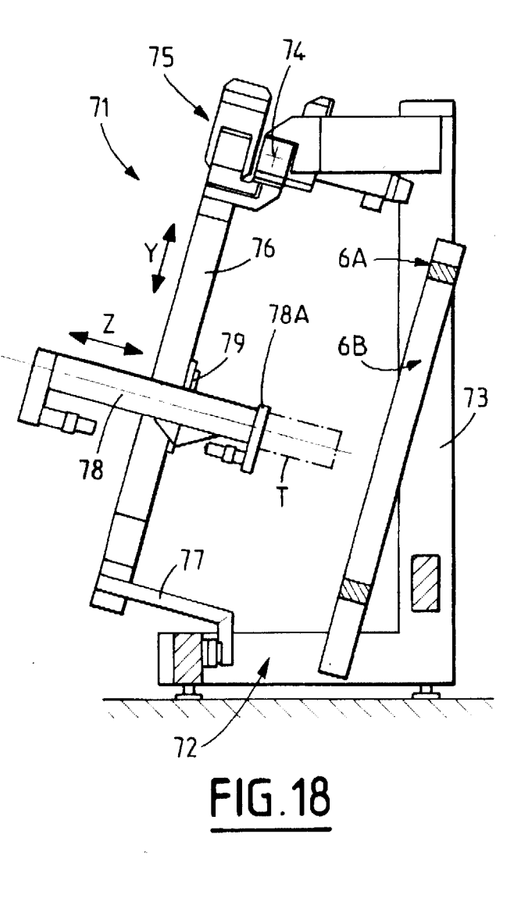
FIG. 18 is a section along the line XVIII—XVIII of FIG. 17.

FIGS. 17 and 18 illustrate another example of a machine for implementing the method according to the invention. This machine 71 makes it possible to work in an inclined working plane in order to improve the ergonomics and to reduce the shopfloor area occupied, for producing reinforcements in the form of a sheet. In this case, as may be seen in FIGS. 17 and 18, the frame 6A, 6B for tiae reinforcement is highly inclined with respect to the horizontal, for example at an angle of approximately 75°, as shown. The space taken up by the machine is then essentially "vertical".

The machine 71 includes a stand provided with a subframe 72 and with vertical uprights 73 which are connected at their upper ends by a horizontal crosspiece 74 and to which the frame GA, 6B may be fixed, at 73A. The crosspiece 74 defines a first linear axis X along which a carriage 75 carrying a bar 76 may slide. The latter is perpendicular to the crosspiece 74 and inclined so as to extend parallel to the plane of the frame 6A, 6B. This bar 76 is firmly attached, at its end on the opposite side from the crosspiece 74, to the subframe 72 by means of an angled connecting bar 77 and defines a second linear axis Y, orthogonal to X. Moreover, the bar 76 in turn carries an arm 78 which can slide along the latter by means of a carriage 79 and which defines a third linear axis Z perpendicular to the plane of the frame 6A, 6B. At its end 78A close to the frame 6A, 6B, the arm 78 carries a rotary spindle 80 serving as a tool holder for a tool T (depicted diagrammatically by the dot/dash lines in FIG. 18) which may be a filling-in head (like the tool 66 in FIG. 16) or a stitching head (like the head, comprising the needle 33/presser-foot 43/ thread-glide 50 assembly, of FIG. 15).

As already indicated, 0° and 90° filling-in (that is to say the laying-down of straight portions of thread in the X and Y directions) is accomplished by to-and-fro motions of the thread between the pegs implanted in the support frame.

It should be noted that the pitch (distance between two adjacent parallel straight portions of thread) of the portions of thread of the ply laid down corresponds to half the pitch (inter-peg spacing) of the pegs arranged on the frame. This makes it possible to use a filling-in tool of relatively large size and rigid pegs on the frame.

Figure 16:
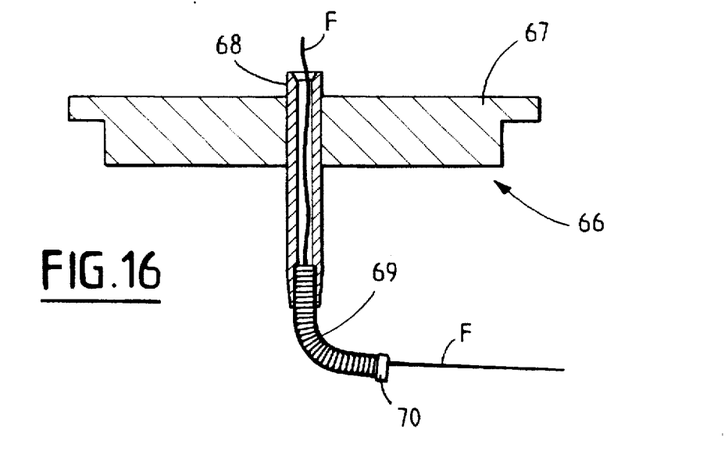
FIG. 16 is a diagrammatic view of a tool for laying down portions of thread, especially straight portions of thread, according to the invention.

While it is passing around a peg, the flexible tube 69 of the filling-in head 66 straightens out, since the thread is not under tension. This makes it possible to lower the point of laying down the thread on the peg.

On the other hand, during the forward motion of filling-in between the pegs, the thread is under tension and the flexible tube bends. This makes it possible to obtain a large radius of curvature, which is favorable for the integrity of the thread, and to bring the point of exit of the thread back up in order to prevent hooking onto the plies already laid down.

As already indicated, 45° (or 135°) filling-in is achieved by incorporating only three pegs in four, for a peg configuration as shown in FIG. 6.

Moreover, it is possible to arrange the threads in a way other than in the directions indicated. For example, 10° threads will be placed within the frame like 0° threads, but with a corresponding offset of the pegs between the two opposite sides of the frame so as to obtain this angle.

For this purpose, it should be further noted that since the displacements of the tools are managed by an NC device comprising a computer in which a special axis-management card is mounted, it is sufficient to program into it the desired trajectories. This is especially so when there are additional guiding and hooking-on pegs making it possible to enhance the reinforcement in an arbitrarily chosen pattern.

In addition, as a safety precaution, detectors (not depicted) for detecting the presence of: fluff or of overtension may be arranged on each filling-in thread.

Figure 19A:
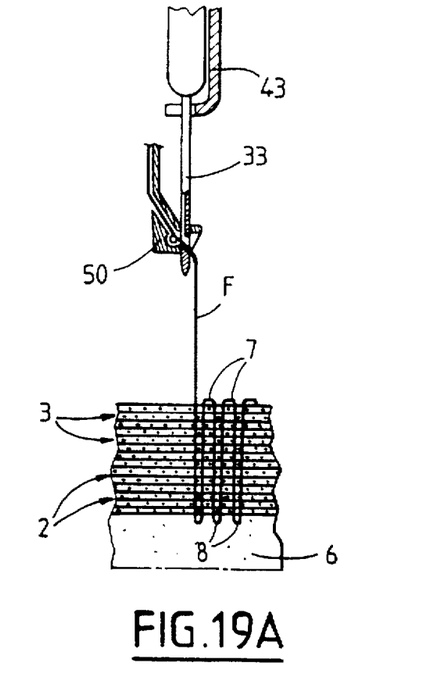
FIGS. 19A to 19D illustrate diagrammatically the procedure for consolidating the superposed plies of the reinforcement produced in accordance with the invention.
Figure 19B:
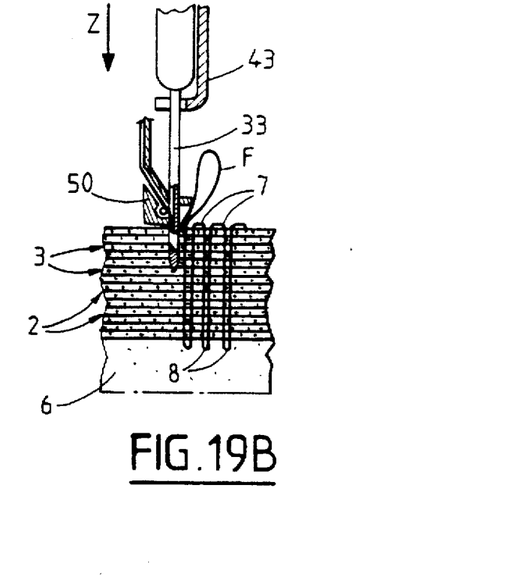
Figure 19C:
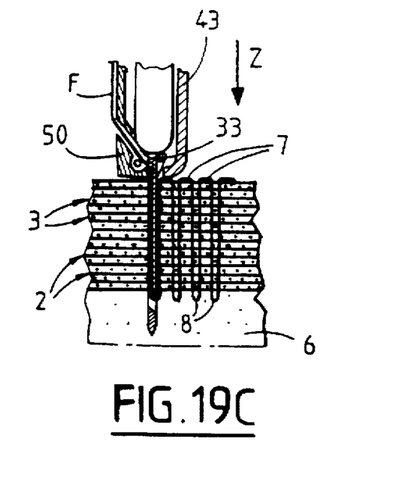
Figure 19D:
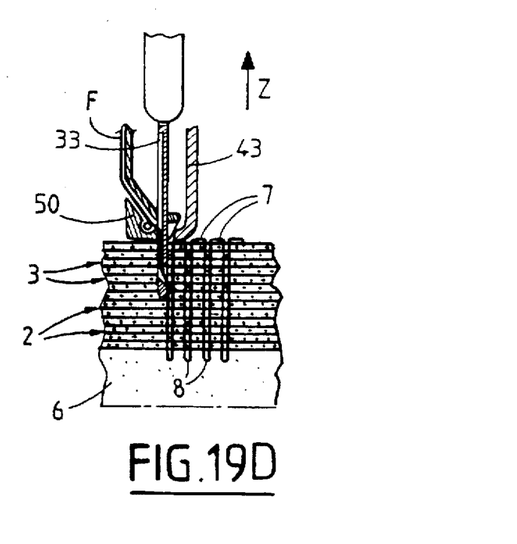

In order to consolidate the superposed plies 2, 3, stitching is performed, as shown in FIGS. 19A to 19D, in the Z direction. In order to do this, while inserting the needle 33 into the plies 2, 3, the thread F is driven by said needle through the plies 2, 3 (FIG. 19B), the thread-gripper (not depicted in FIGS. 19A to 19D) being tightened up and the travel of the needle being adjusted so as to penetrate into the support 6. As the needle 33 is being withdrawn, from the plies 2, 3, the thread-gripper is slackened off and the needle moves out, progressively releasing the thread F through the plies 2, 3, thus forming a nonclosed loop 8 which is retained solely by the foam forming the support and by the friction of the thread in the plies 2 and 3 (FIGS. 19C, 19D).

Thus, it is by virtue of the elastic pressure of the foam closing up over the loop after the needle has been withdrawn on the one hand, and of the friction and gripping in the plies 2, 3 on the other hand, that, when the needle has been withdrawn, the thread F, which passes freely through the needle during this withdrawal, is retained in order to form the open loop 8.

After it has been removed from the plies 2 and 3, the needle is moved up above the surface of said plies by a distance equal to the thickness to be stitched plus the stitching pitch 7, that is to say the spacing desired between two stitches (FIG. 19A).

The thread-gripper is then actuated in order to lock the thread in the needle, the stitching head is moved by one pitch and the device is once again actuated in order to restart the cycle so as to form continuously a large number of loops with the same thread F, that is to say in order to form the stitches 8 of one row. The row of the next loops is brought about after a relative displacement of the needle 33 with respect to the reinforcement 1.

More specifically, as may be seen in FIGS. 19A–19D, starting from the initial (and final) position shown in FIG. 19A, in which the presser-foot 43 has just been raised, the stitching head is 'Lowered (in the way described hereinbelow with regard to FIG. 15) in order to form a loop 8 of thread during the descent of the needle 33 through the superposed plies 2, 3. It should be pointed out that, at this moment, the thread-guide 50 is stopped in contact with the uppermost ply (FIG. 19B). Since the needle 33 is in its lowermost position (FIG. 19C), the presser-foot 43 in turn bears on the uppermost ply of the superposed plies 2, 3, trapping the loop 8. It is this combined action of the pressing of the thread-guide 50 and especially of the presser-foot 43 which ensures compaction of the superposed plies, which then have a density of the portions of thread constituting them which is sufficient to retain the ply-consolidating thread by means of friction. Since the presser-foot 43 remains in contact with the uppermost ply as the needle 33 rises (FIG. 19D), the thread slides in the eye of the needle which remains in place.

Now also in relation to FIG. 15, the needle 33 is lowered by the cylinder actuator 54 which descends, driving the plate 55 and therefore all the components fixed to said plate. At the start of this descent, that is to say before the needle 33 penetrates into the superposed plies 2, 3, the thread F is held in place by the thread-gripper 61 and the thread-guide 50, also acting as a thread-gripper, and forms a loop (FIG. 19A).

When the needle 33 penetrates into the plies 2, 3, the thread-guide 50 comes into contact with these plies, immobilizing the spindle 57, and the thread F slides in the thread-guide 50, while the previously formed loop of thread is pushed into the plies (FIG. 19B). When the needle 33 has reached its lowermost position (FIG. 19C), the presser-foot 43 is brought into contact with the uppermost ply by actuation of the cylinder actuator 59 in order to lower it, this ensuring compaction of the superposed plies, and then the rise of the cylinder actuator 54, and thus of the needle 33, is initiated (FIG. 19D).

While the needle 33 is rising through the plies 2, 3, the presser-foot 43 remains pressed against these plies under the thrust of the associated cylinder actuator 59. The thread is then gripped by the thread-grippers. When the stop 63 comes back into contact with the bush 60, the thread-guide 50 rises up with the needle 33 and the thread slides in the former. The end of the rise of the needle 33 initiates the rise of the presser-foot 43. The thread is gripped by the thread-guide 50 and slides in the upper thread-gripper 61.

It will be noted that the length of thread consumed during each stitching operation may be measured by the rotation of a coder (not depicted) and compared with a programmed value.

Figure 20:
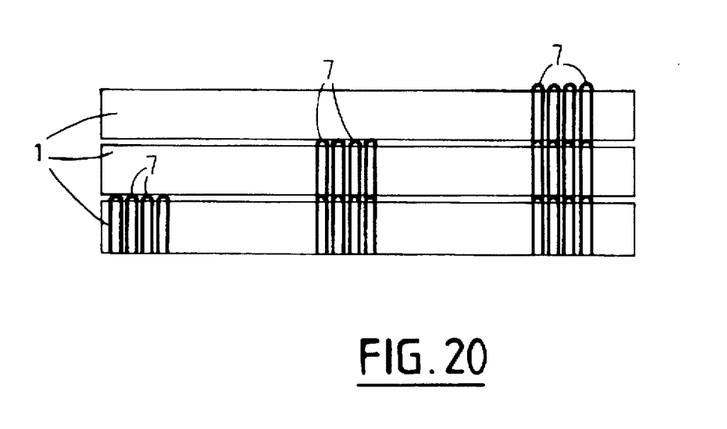
FIG. 20 illustrates the superposition and consolidation of several reinforcements produced in accordance with the invention.

As shown in FIG. 20, in order to produce thick blocks constituted by the superposition of reinforcements 1, forming plane elementary sheets, joined together by stitching in the Z direction, either in twos or in threes, depending on the case. It should be noted that FIG. 20 does not show the final product obtained but illustrates, diagrammatically, the "superposition" of successive stitching operations relating to one sheet, then a second sheet and, finally, the third sheet. In each case, the stitching may be carried out as described previously.

Figure 21:
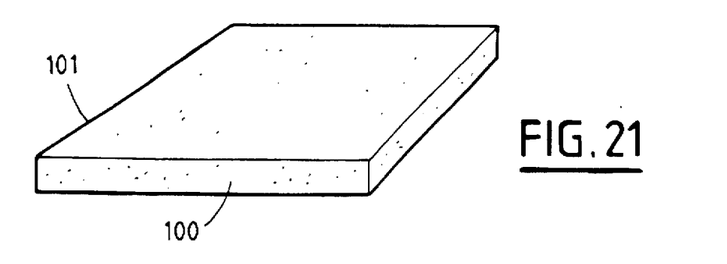
FIGS. 21 to 23 show diagrammatically, in perspective, various examples of composite components comprising a reinforcement produced in accordance with the invention.
Figure 22:
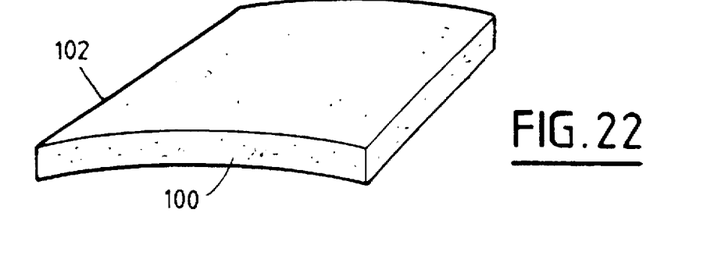
Figure 23:
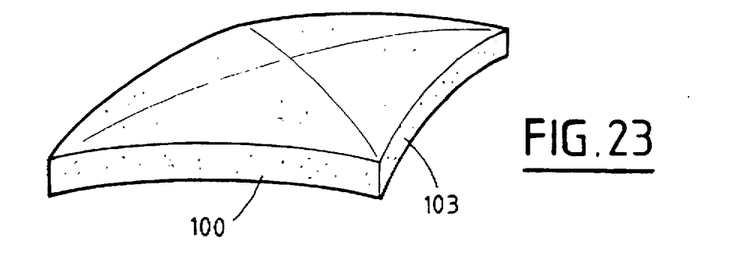

FIGS. 21 to 23 show, by way of examples, various composite components comprising a reinforcement produced ini accordance with the invention and embedded in a cured matrix 100. Thus, FIG. 21 shows a flat panel 101, FIG. 22 a convex panel 102 and FIG. 23 a bi-convex panel 103.

It should be noted that, prior to the impregnation with the matrix, the reinforcement in the form of a sheet, produced in accordance with the invention, may be extracted by cutting off the outside of the frame and by detaching it (by tearing) from the foam. The periphery is lost and only the central part corresponding to an elementary sheet is recovered.

Thus, the invention makes it possible to produce, simply and in an industrial manner, large composite components from which may be cut out elementary components possibly having internal reinforcing members for absorbing specific forces which the component may possibly be subjected to in service. It is also possible to produce complex and/or thick assemblies by assembling individual sheets connected together by stitching.

We claim:

1. A method for producing a reinforcement in a form of a sheet for a composite component formed by said reinforcement embedded in a cured matrix, said reinforcement including superposed plies of thread, according to which method:

said superposed plies are produced by arranging, for each ply, straight portions of thread at least substantially in a parallel fashion with respect to each other, the straight portions of thread of each ply extending in a direction which is either parallel or crossed with respect to a direction of the straight portions of thread of any other ply in the reinforcement, said superposed plies being elastically compactible between an uncompacted state and a compacted state, and all the superposed plies are consolidated by using a thread passing through said plies, said consolidating thread passing and repassing through said plies in order to cover at least a major part of a surface of said plies, wherein, said superposed plies are laid down on a support;

said superposed plies are compacted by mechanical pressure to said compacted state in which said tread which constitutes said superposed plies has a compaction density; and in order to preserve said compacted state of said plies which is thus obtained, the thread for consolidating the plies is stitched, without knotting, through said superposed plies at least as far as a level of the surface of said support to form unknotted stitches over at least a major part of the surface of said superposed plies, said compaction density being sufficient to retain said consolidating thread by means of friction, said unknotted stitches being composed of two lengths of a single thread portion, said two lengths of said single thread portion being disposed next to each other along a linear path through plurality of said superposed plies, said two lengths of said thread portion being integrally joined together at an open loop, said open loop having no thread passing through it.

2. The method as claimed in claim 1, wherein a matrix material is added, wherein the composite component has a volume, and wherein the compaction density is such that said portions of thread occupy at least 40% of the volume of the composite component, leaving a remainder that is occupied by the consolidating thread and the matrix material.

3. The method as claimed in claim 2, wherein said portions of thread occupy between 40 and 60% of the volume of the composite component.

4. The method as claimed in claim 2, wherein the consolidating thread occupies from 1 to 10% of the volume of the composite component.

5. The method as claimed in claim 1, wherein each of said straight portions of thread is pulled tight between two points for positionally fixing an end of each of said portions.

6. The method as claimed in claim 5, wherein each positional fixing point is manifested by a peg implanted in a marginal zone of said support, around which peg passes a junction between two straight portions of thread of a single direction but of opposite senses.

7. The method as claimed in claim 1, wherein said support comprises a quadrilateral frame surrounding a mass of soft material and wherein a plurality of hooking-on pegs are implanted on a perimeter of said frame.

8. The method as claimed in claim 7, wherein said hooking-on pegs are implanted on the perimeter of said frame, these being uniformly distributed in a pattern of a broken line on each face of the frame.

9. The method as claimed in claim 7, wherein guiding pegs are implanted inside the hooking-on pegs, forming several rows of pegs in a staggered configuration on each face of the frame.

10. The method as claimed in claim 7, wherein said hooking-pegs are implanted so as to incline outwardly from the frame.

11. The method as claimed in claim 7, wherein additional guiding and hooking-on pegs are implanted in the mass of soft material surrounded by the frame.

* * * * *